US010784511B1

(12) United States Patent
Harrison et al.

(10) Patent No.: US 10,784,511 B1
(45) Date of Patent: Sep. 22, 2020

(54) NANOPOROUS CARBON AS AN ANODE MATERIAL FOR LI-ION BATTERIES

(71) Applicant: National Technology & Engineering Solutions of Sandia, LLC, Albuquerque, NM (US)

(72) Inventors: Katharine Lee Harrison, Albuquerque, NM (US); Matthaeus Wolak, Albuquerque, NM (US); Michael P. Siegal, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 95 days.

(21) Appl. No.: 16/195,371

(22) Filed: Nov. 19, 2018

Related U.S. Application Data

(60) Provisional application No. 62/588,746, filed on Nov. 20, 2017.

(51) Int. Cl.
*H01M 4/587* (2010.01)
*H01M 10/0525* (2010.01)
*H01M 4/62* (2006.01)
*H01M 4/36* (2006.01)
*H01M 4/02* (2006.01)

(52) U.S. Cl.
CPC .......... *H01M 4/587* (2013.01); *H01M 4/366* (2013.01); *H01M 4/62* (2013.01); *H01M 10/0525* (2013.01); *H01M 2004/021* (2013.01); *H01M 2004/027* (2013.01)

(58) Field of Classification Search
CPC .. H01M 4/587; H01M 10/0525; H01M 4/366; H01M 4/62; H01M 2004/021; H01M 2004/027

USPC ....................................................... 429/231.8
See application file for complete search history.

(56) References Cited

U.S. PATENT DOCUMENTS

2010/0021819 A1* 1/2010 Zhamu ................. H01M 4/133
429/231.8
2011/0111294 A1* 5/2011 Lopez .................. H01M 4/386
429/217

OTHER PUBLICATIONS

Goriparti, S. et al., "Review on recent progress of nanostructured anode materials for Li-ion batteries", Journal of Power Sources, vol. 257 (2014), pp. 421-443.
Jiang, J., "Evolution of disposable bamboo chopsticks into uniform carbon fibers: a smart strategy to fabricate sustainable anodes for Li-ion batteries", Energy Environ. Sci., vol. 7 (2014), pp. 2670-2679.
Qi, Y. and Harris, S.J., "In Situ Observation of Strains during Lithiation of a Graphite Electrode", Journal of The Electrochemical Society, vol. 157 (6) (2010), pp. A741-A747.
Siegal, M.P. et al., "Nanoporous Carbon Films for Gas Microsensors", Langmuir, vol. 20 (2004), pp. 1194-1198.
Mukherjee, R. et al., "Defect-induced plating of lithium metal within porous graphene networks", Nature Communications, vol. 5 (2014), 10 pages (DOI: 10.1038/ncomms4710).
Cao Y. et al., "Atomic Layer Deposition of LixAlyS Solid-State Electrolytes for Stabilizing Lithium-Metal Anodes", ChemElectroChem Communications, vol. 3, pp. 858-863.

(Continued)

*Primary Examiner* — Gary D Harris
(74) *Attorney, Agent, or Firm* — Kevin W. Bieg

(57) ABSTRACT

Nanoporous carbon provides a binderless, three-dimensional form of graphene as an anode material for lithium-ion batteries.

6 Claims, 8 Drawing Sheets

(56) References Cited

OTHER PUBLICATIONS

Dudney, Nancy J., "Addition of a thin-film inorganic solid electrolyte (Lipon) as a protective film in lithium batteries with a liquid electrolyte", Journal of Power Sources, vol. 89 (2000), pp. 176-179.
Cheng, H.-M. et al., "Enhanced Cycleabity in Lithium Ion Batteries: Resulting from Atomic Layer Depostion of Al2O3 or TiO2 on LiCoO2 Electrodes", J. Phys. Chem. C. vol. 116 (2012), pp. 7629-7637.
Manthiram, A. et al., "Lithium battery chemistries enabled by solid-state electrolytes", Nature Reviews Materials, vol. 2 (2017), 16 pages.
Wu, Z.-S. et al., "Graphene/metal oxide composite electrode materials for energy storage", Nano Energy, vol. 1 (2012), pp. 107-131.
Siegal, M.P. et al., "Nanoporous-carbon films for microsensor preconcentrators", Applied Physics Letters, vol. 80, No. 21 (2002), pp. 3940-3942.
Siegal, M.P. and Yelton, W.G., "Nanoporous-Carbon Coatings for Gas-Phase Chemical Microsensors", Advances in Science and Technology, vol. 48 (2006) pp. 161-168.
Siegal, M.P. et al., "Detecting Trihalomethanes Using Nanoporous-Carbon Coated Surface-Acoustic-Wave Sensors", Journal of the Electrochemical Society, vol. 162 (6) (2015), pp. B114-B120.
Limmer, S.J. et al., "Nanoporous Carbon for Electrochemical Capacitors", ECS Transactions, vol. 28 (8) (2010), pp. 89-95.
Siegal, M.P. et al., "Nanoporous-Carbon as a Potential Host Material for Reversible Mg Ion Intercalation", Journal of The Electrochemical Society, vol. 163 (6) (2016), pp. A1030-A1035.

\* cited by examiner

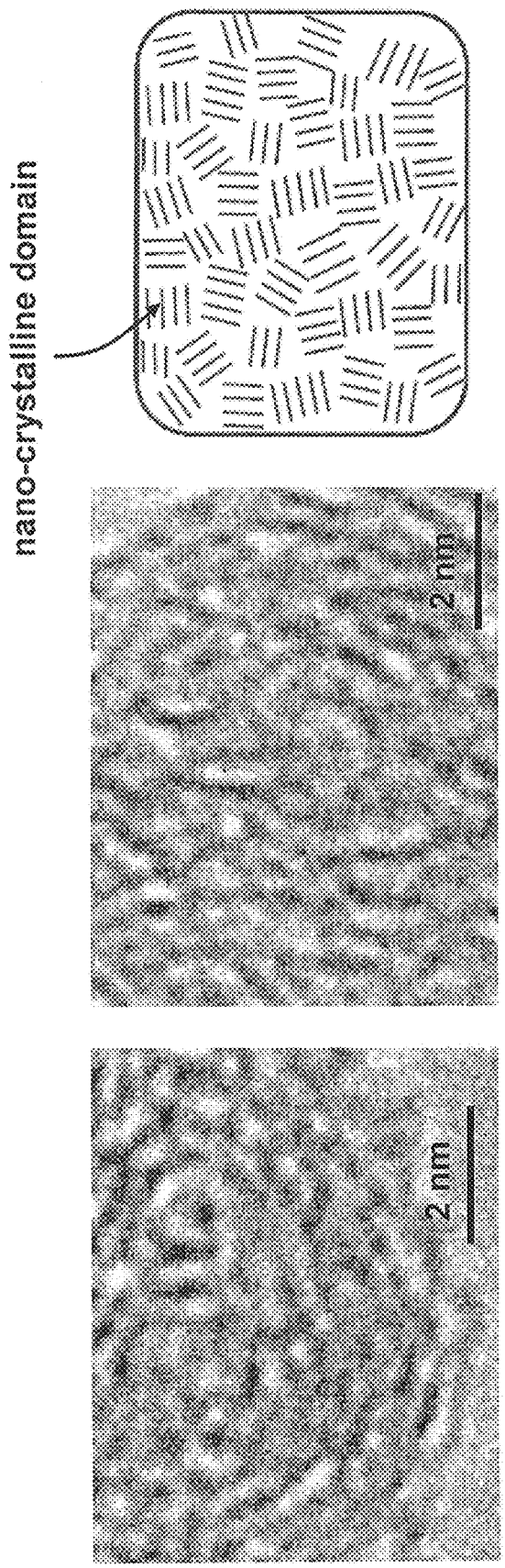

NANOPOROUS CARBON AS AN ANODE MATERIAL FOR LI-ION BATTERIES

CROSS-REFERENCE TO RELATED APPLICATION

This application claims the benefit of U.S. Provisional Application No. 62/588,746, filed Nov. 20, 2017, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to Li-ion battery electrochemical energy storage and, in particular, to nanoporous carbon as an anode material for Li-ion batteries.

BACKGROUND OF THE INVENTION

Developing electrochemical (EC) energy storage systems (i.e. batteries, ultra-capacitors) with increased energy/power densities is critically important for commercial and military applications. These include portable electronics, electrification of vehicles, and high energy storage capacity for the grid as the nation moves to renewable energy sources with discontinuous energy production, such as wind and solar.

Li-ion energy storage provides near optimal performance. Lithium metal would be an ideal anode material because it has a high theoretical specific energy capacity of 3861 mAh/g and a volumetric capacity of 2061 mAh/cm$^3$. However, lithium metal has several problems that inhibit its use in electrochemical storage systems, including the formation of a solid electrolyte interphase (SEI), uncontrolled morphology issues (e.g., dendrite formation, which can cause short circuiting), and low coulombic efficiency. Metal alloys also can exhibit high charge storage capacities and morphology is more well controlled, but alloys can suffer large irreversible capacity losses due to stress-induced cracking. Therefore, state-of-the-art (SOA) batteries are based on Li-ion intercalation into carbon anode materials. Carbon has the combined advantages of low cost, abundant availability, low delithiation potential, high electrical conductivity, and relatively low volume change during lithiation/delithiation. In particular, lithium-intercalated graphite is the SOA anode material used in Li-ion batteries today and has allowed Li-ion batteries to become ubiquitous in many applications. See S. Goriparti et al., *J. Power Sources* 257, 421 (2014). When lithium intercalates into graphitic carbon, it forms a LiC6 crystalline phase that has a theoretical specific energy capacity of 372 mAh/g and a volumetric capacity of 841 mAh/cm$^3$. Graphite has been optimized in SOA batteries such that its practical capacity (~300-330 mAh/g) is close to the limits of its theoretical capacity. See J. Jiang et al., *Energy Environ. Sci.* 7, 2670 (2014). Importantly, the volumetric expansion due to the lithiation of graphite is typically less than 10%. See Y. Qi and S. J. Harris, *J. Electrochem. Soc.* 157(6), A741 (2010). This low volumetric change enables the graphitic carbon anode to survive thousands of charge/discharge cycles before degradation. However, graphite has a small, 3.35 Angstrom, interplanar spacing that allows only one layer of Li ions between the sheets. Graphitic carbon electrodes are typically constructed from powder graphite particles mixed with a conductive carbon filler and a binder to generate a conductive, porous electrode. The pores allow intimate contact with the electrolyte throughout the thickness of the porous electrode. However, these additives also further reduce the total charge capacity available using graphite electrodes. Graphene may be an attractive alternative for reversible lithium storage in Li-ion batteries, due to its large surface-to-volume ratio and high conductivity. Graphene is a two-dimensional crystal of carbon, essentially a single layer cut out of the graphite structure. However, graphene sheets must be assembled into a bulk electrode and that process leads to a disordered carbon architecture. The mechanisms for incorporation of lithium into graphene and other disordered carbon electrodes are still under debate and likely depend on the structure, density, and chemical composition of the assembled graphene electrode. The potential mechanisms include lithium intercalation, adsorption of lithium on both sides of the sheets, lithium adsorption with functional groups at defects and edges of the sheets, and lithium plating or adsorption in open pores between sheet stacks. However, graphene also has been found to have low coulombic efficiency and experiences capacity fade. Additionally, graphene lithiates over a wide range of voltages which would result in a varying cell voltage when paired with a cathode in a full cell. Thus, it is likely that only a portion of the capacity could be used in a real system to minimize the voltage variation with state of charge.

SUMMARY OF THE INVENTION

Nanoporous carbon (NPC) has been developed as an anode material for Li-ion batteries. Galvanostatic cycling experiments in coin cells have demonstrated that NPC behaves like a three-dimensional graphene anode. The interplanar spacing between sheets in the NPC can be controlled and the spacing greatly affects the charge storage capacity. Some sheet spacings exhibit charge storage capacities ~3-4× that of SOA graphite and ~1.5-3.5× the theoretical capacity of graphene. As is typical with graphene, capacity fades with cycling for most samples, with the exception of samples synthesized at very low density where the capacity increases with cycling. Protective coatings, solid electrolytes, and co-deposition of nanoparticles can minimize the capacity fade. NPC is synthesized through pulsed laser deposition (PLD). Therefore, it is of particular interest for application in thin film batteries because their fabrication is compatible with thin film deposition techniques like PLD.

BRIEF DESCRIPTION OF THE DRAWINGS

The detailed description will refer to the following drawings, wherein like elements are referred to by like numbers.

FIG. 2A is a TEM image of NPC material with a density 1.0 g/cm$^3$. FIG. 2B is a TEM image of NPC material with a density 0.25 g/cm$^3$. FIG. 2C is a schematic illustration showing the nanocrystalline domain structure of NPC.

DETAILED DESCRIPTION OF THE INVENTION

Figure 1:
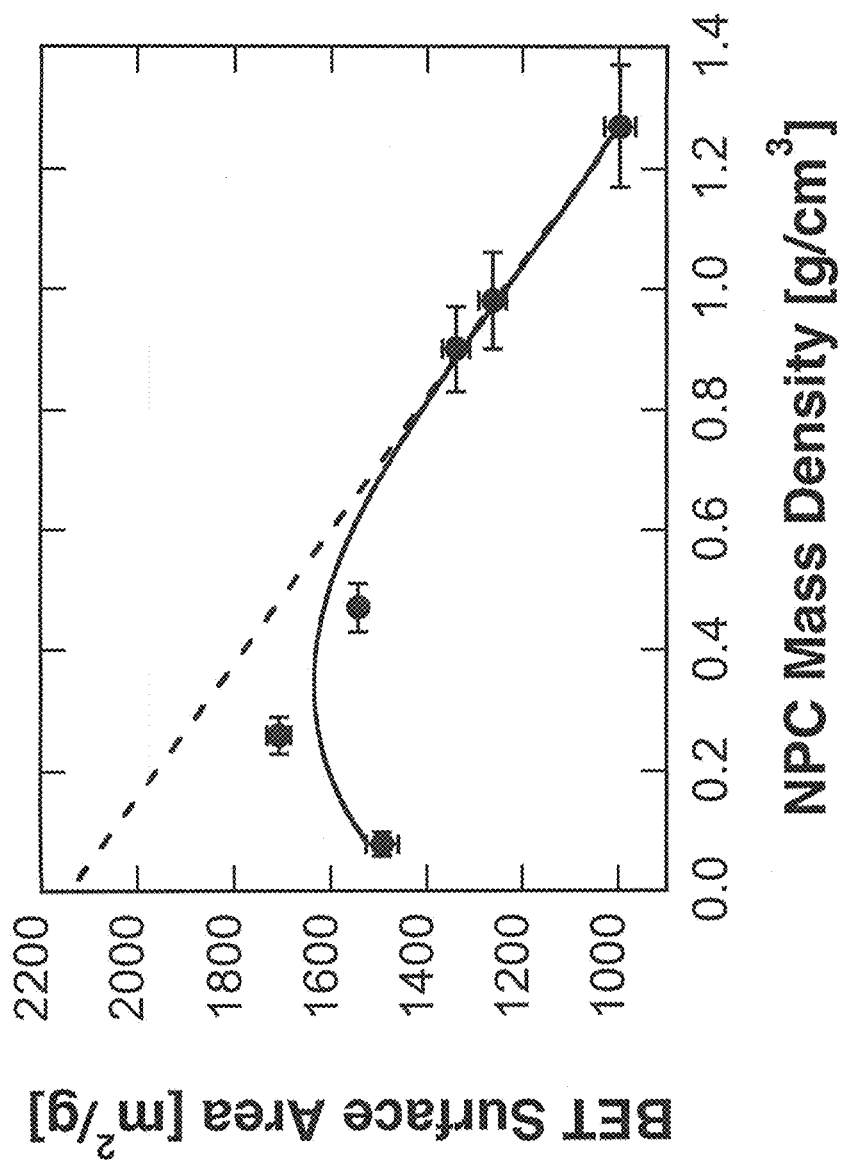
FIG. 1 is a graph of the NPC surface area calculated from BET isotherms as a function of NPC mass density.

NPC is a unique and attractive carbon material for Li-ion storage. NPC materials can be grown with controlled mass density and total surface area. The total surface area for a given mass of material defines the fraction of material that is available for reaction with Li to form the lithiated carbon phase. The Brunauer-Emmett-Teller (BET) method can be used to measure surface areas. See S. Brunauer et al., *J. Am. Chem. Soc.* 60, 309 (1938). FIG. 1 shows how surface area varies with NPC mass density. The solid line is merely a guide-for-the-eye. Surface area increases with decreasing mass density for all but the lowest mass density materials studied, ranging from 997±32 $m^2/g$ to 1,709±24 $m^2/g$ for samples with mass densities ranging from 1.27-0.26 $g/cm^3$, respectively. Overall, such values are mostly higher than those reported for other carbon materials. For example, while the surface area of a single graphene sheet is 2,630 $m^2/g$, chemically-modified graphene agglomerates used for graphene-based ultracapacitors report BET surface area of only 705 $m^2/g$. See M. D. Stoller et al., *Nano Lett.* 8, 3498 (2008). Ordered mesoporous carbons have 1,500-1,800 $m^2/g$ surface areas, similar to the NPC results, however, such materials typically have extremely low mass densities <0.1 $g/cm^3$ due to the nature of their porosity, rendering them to be very soft mechanical structures. See R. Ryoo et al., *Adv. Mater.* 13, 677 (2001). Carbon nanotube bundles have BET surface areas ranging from 200-600 $m^2/g$ depending on tube diameters and other structure characteristics. See F. Li et al., *Carbon* 42, 2375 (2004). So, while both graphene and nanotubes have very high individual surface areas, in agglomerates and bundles most of the measurable surface area is diminished. NPC is electrically conductive and mechanically continuous; hence it does not require the use of binder materials to hold to particles together or conductive additives. Eliminating the need for a binder alone can provide a small, but important enhancement to Li-ion energy capacity.

NPC can have such high surface areas for relatively high mass densities due to the unique nature of its microstructure. The internal structure of NPC comprises nanofragments of randomly oriented graphene sheet stacks ("3D graphene") that have interplanar spacings expanded by as much as 55% compared to crystalline graphite. Shown in FIG. 2A is a high-resolution transmission electron microscopy (TEM) image of NPC material with a density 1.0 $g/cm^3$, having an interplanar spacing of about 4.4-4.8 Å. FIG. 2B shows a TEM image of NPC material with a density 0.25 $g/cm^3$, having an interplanar spacing of about 5.1-5.4 Å. Several occurrences of nanofragments exist in both images. Typical crystalline domain sizes are only 1-2 nm in length. In contrast, the interplanar spacing of crystalline graphite is only 3.35 Å. Hence, NPC consists of randomly-oriented graphene nano-crystallites with expanded interplanar spacings and a plethora of grain boundaries to enable rapid diffusion of species into an entire volume. This is illustrated schematically in FIG. 2C. Reducing the mass density of NPC increases the interplanar spacings, creating enhanced diffusion channels to enable intercalations of various ionic species. See M. P. Siegal et al., *Langmuir* 20, 1194 (2004).

NPC can be synthesized through pulsed laser deposition (PLD) by ablating a rotating pyrolytic graphite target with a 248-nm ultraviolet pulsed excimer laser in a controlled argon atmosphere. See M. Siegal et al., *Appl. Phys. Lett.* 80, 3940 (2002); M. Siegal and W. Yelton, *Nanoporous-Carbon Coatings for Gas-Phase Chemical Microsensors*, Advances in Science and Technology, Trans Tech Publ: 2006; pp 161-168; M. P. Siegal et al., *J. Electrochem. Soc.* 162, B114 (2015); S. J. Limmer et al., *ECS Trans.* 28, 89 (2010); and M. P. Siegal et al., *J. Electrochem. Soc.* 163, A1030 (2016), which are incorporated herein by reference. The interplanar spacing of NPC and the NPC film density is controlled by the argon gas pressure, laser energy, and target-substrate distance used during growth. As described above, the internal structure of NPC self-assembles during growth and consists of nano-fragments of aligned graphene sheet assemblies that stack randomly to provide a plethora of grain boundaries for rapid diffusion. As deposited, NPC is a pure $sp^2$-bonded carbon material with negligible residual stress, enabling the growth of multi-m thick films.

Figure 3A:
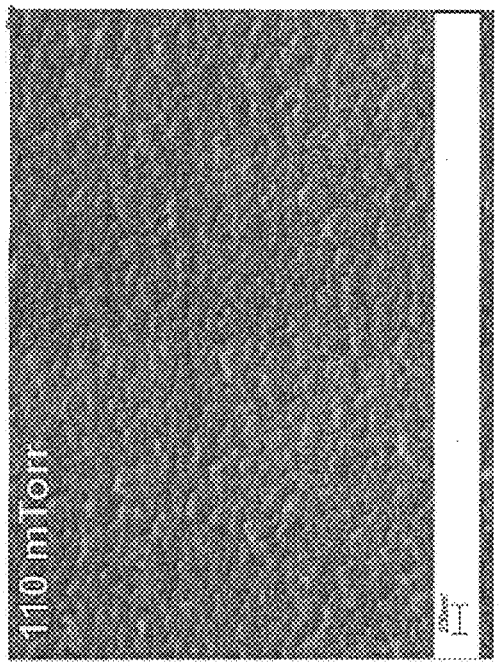
FIGS. 3A-3D are scanning electron microscope images that show the NPC surface morphology as a function of argon pressure.
Figure 3B:
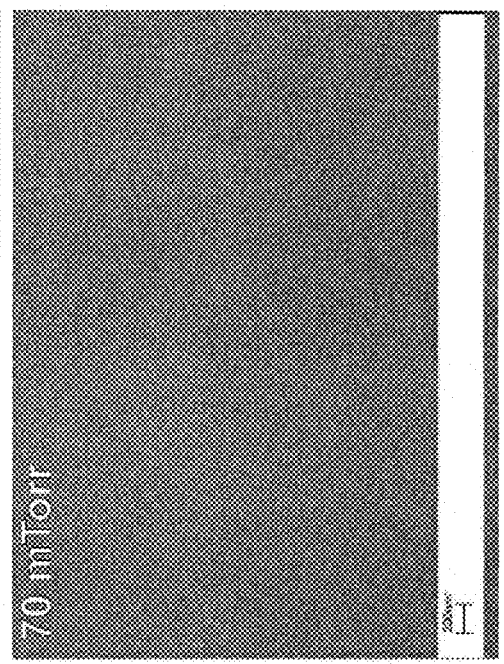
Figure 3C:
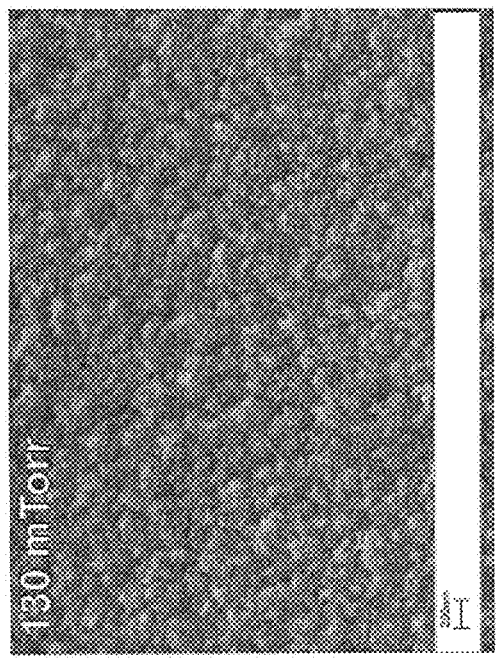
Figure 3D:
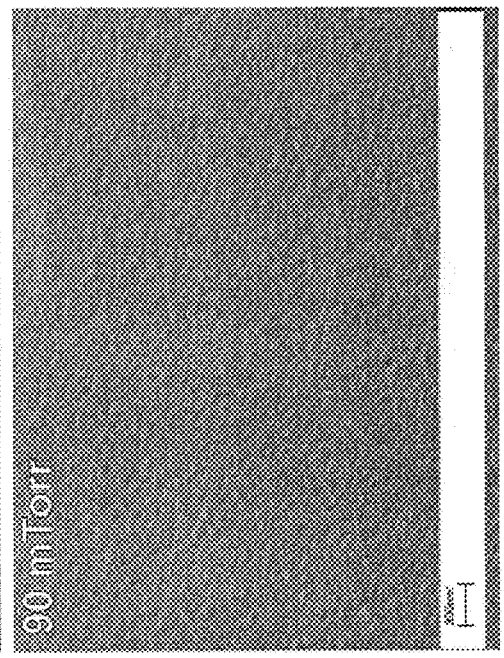
Figure 4:
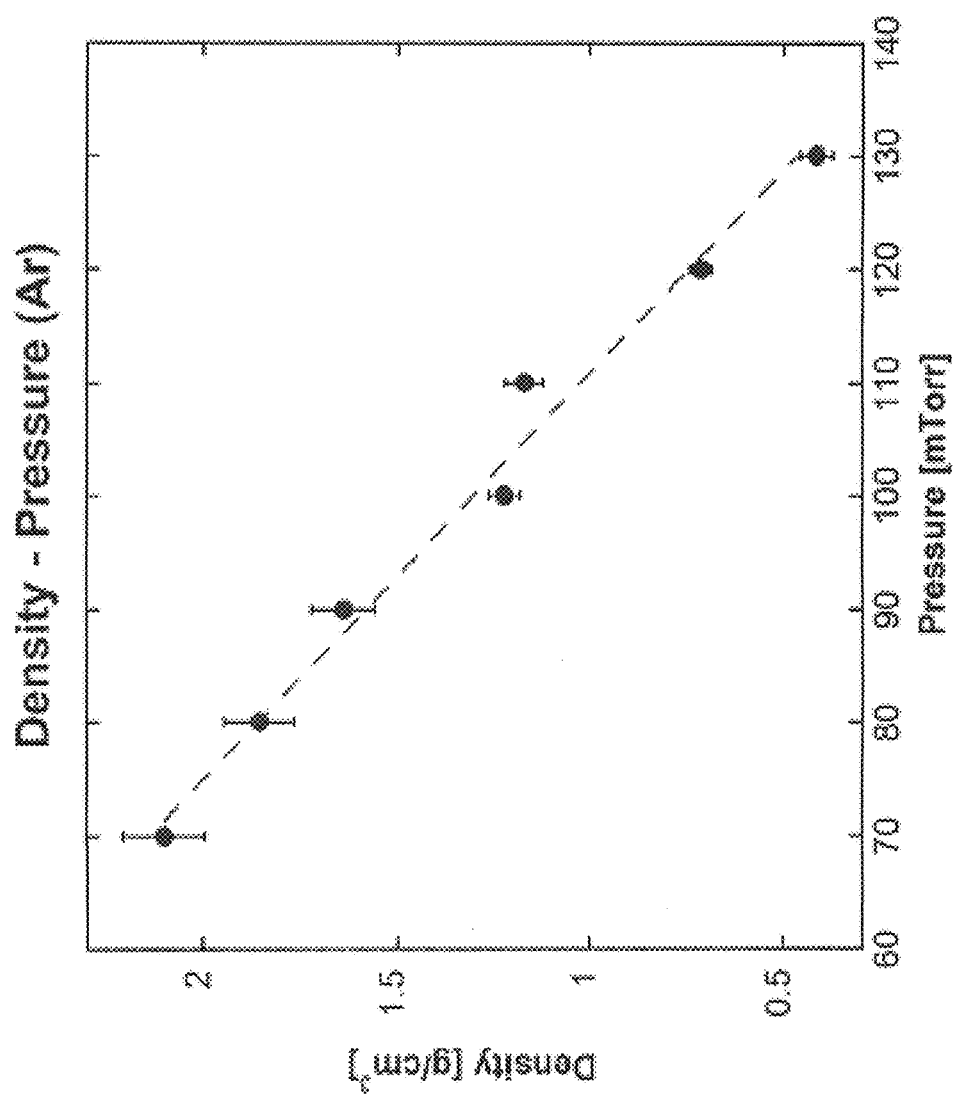
FIG. 4 is a graph of the NPC mass density as a function of Ar deposition pressure.

FIGS. 3A-3D are scanning electron microscope (SEM) images that show the NPC surface morphology as a function of argon pressure. All the deposited films had a carbon areal mass density of about 0.05 $mg/cm^2$. FIG. 3A is an SEM of a NPC film having a density of 0.42 $g/cm^3$ deposited at 130 mTorr Ar pressure. FIG. 3B is an SEM of a NPC film having a density of deposited 1.19 $g/cm^3$ at 110 mTorr Ar pressure. FIG. 3C is an SEM of a NPC film having a density of 1.64 $g/cm^3$ deposited at 90 mTorr Ar pressure. FIG. 3D is an SEM of a NPC film having a density of 2.1 $g/cm^3$ deposited at 130 mTorr Ar pressure. FIG. 4 is a graph of the NPC mass density as a function of Ar deposition pressure.

Figure 5:
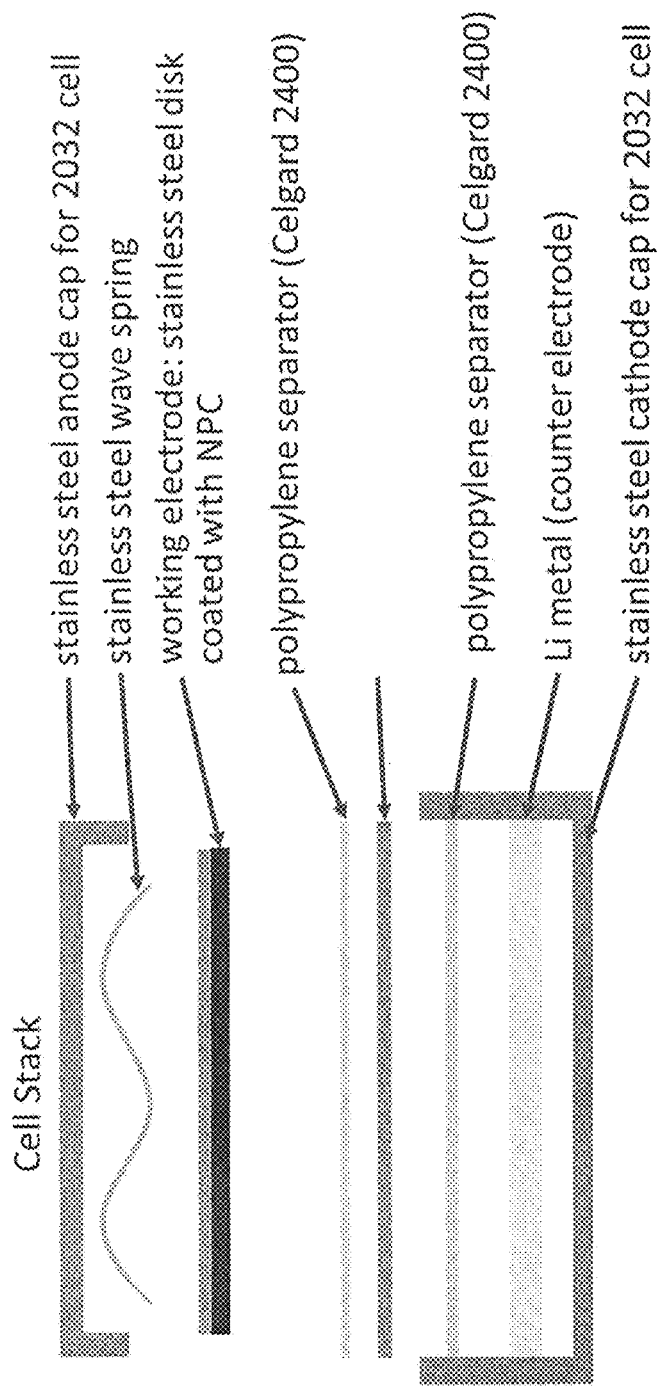
FIG. 5 is a schematic illustration of a coin cell battery assembly.

Electrochemical testing was performed for NPC films of varying volumetric mass density. NPC films were deposited onto stainless steel discs and assembled in a coin cell battery for electrochemical evaluation, as shown in FIG. 5. All NPC films were dried and outgassed for over 48 hours prior to assembly into a coin cell in a Ar-purged glove box. 1 M $LiPF_6$ in 1:1 ethylene carbonate:diethyl carbonate (EC: DEC) was used as the electrolyte solution. Lithium metal was used as the counter electrode. The NPC films tested had mass densities of 0.65 $g/cm^3$, 0.81 $g/cm^3$, 1.02 $g/cm^3$, 1.29 $g/cm^3$, 1.56 $g/cm^3$, 1.87 $g/cm^3$, and 1.98 $g/cm^3$. Because all films were deposited with areal density of about 0.05 $mg/cm^2$, the thicknesses varied accordingly to achieve the mass densities in FIG. 5.

Figure 6A:
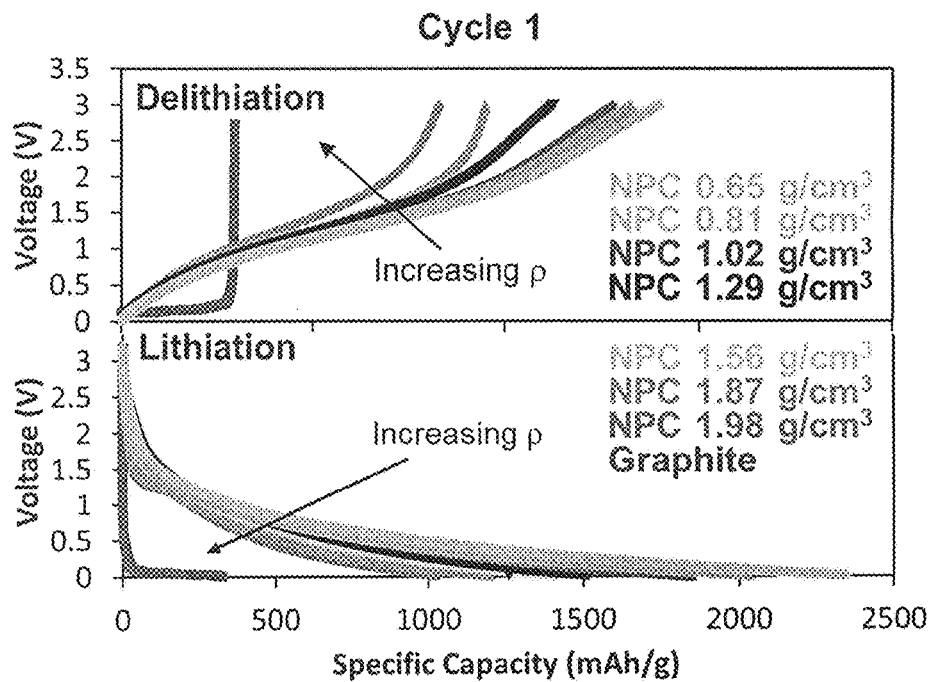
FIG. 6A is a graph of the galvanostatic charge-discharge curves for a graphite battery and NPC coin cell batteries for the $1^{st}$ cycle.
Figure 6B:
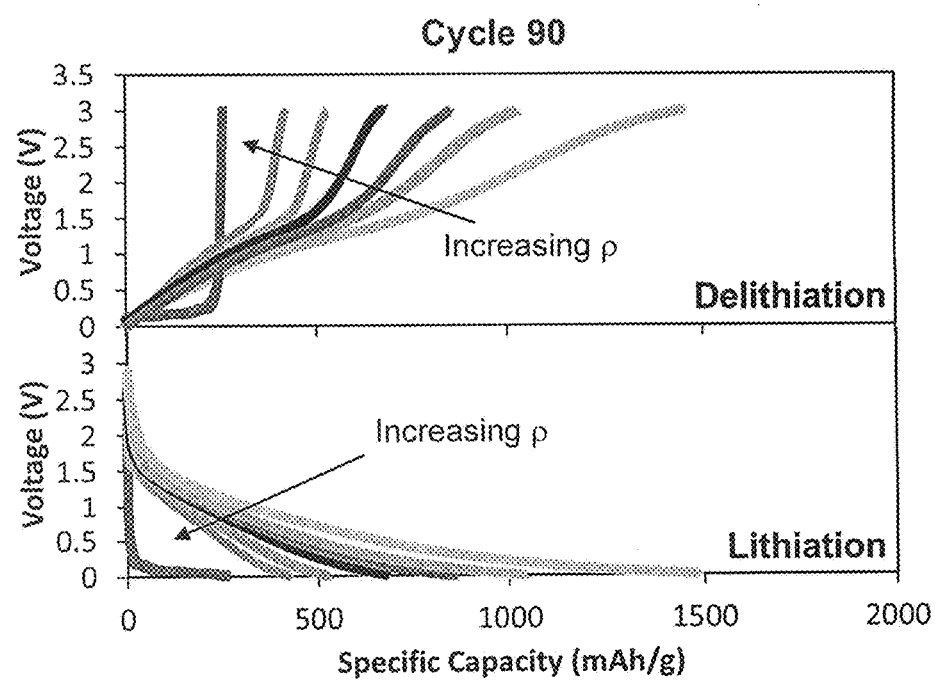
FIG. 6B is a graph of the galvanostatic charge-discharge curves for the $90^{th}$ cycle.

FIGS. 6A and 6B are graphs of the galvanostatic charge-discharge curves for a graphite coin cell and NPC coin cells versus Li metal counter electrodes for the $1^{st}$ and $90^{th}$ cycle, respectively. These graphs indicate that Li can be successfully inserted into NPC. For example, the 0.65 $g/cm^3$ NPC anode delivered a specific capacity of slightly over 2300 mAh/g in the initial lithium insertion and a capacity of about 1400 mAh/g in the first lithium removal, as shown in FIG. 6A. The irreversible portion of the capacity could indicate the formation of an SEI layer in the first cycle or lithium irreversibly reacting with edge groups on the graphene sheets. Further, it is apparent that NPC behaves like graphene, rather than graphite. See G. Wang et al., *Carbon* 47(8), 2049 (2009). This observation is in correlation to the expanded interplanar spacing and higher degree of disorder in sheet assembly of NPC as compared to graphite. However, as shown in FIG. 6B, the irreversibility is minimized in later cycles. In fact, for the 0.65 g/cm$^3$ sample, the capacity increased with cycling after an initial decrease. This behavior has been previously attributed to lithium plating within pores in disordered carbon structures. See R. Mukhergee et al., *Nat. Commun.* 5, 4710 (2014). Therefore, it is likely that the lithium storage mechanisms in NPC change with density and lithium plating in pores dominates at low density.

Figure 7A:
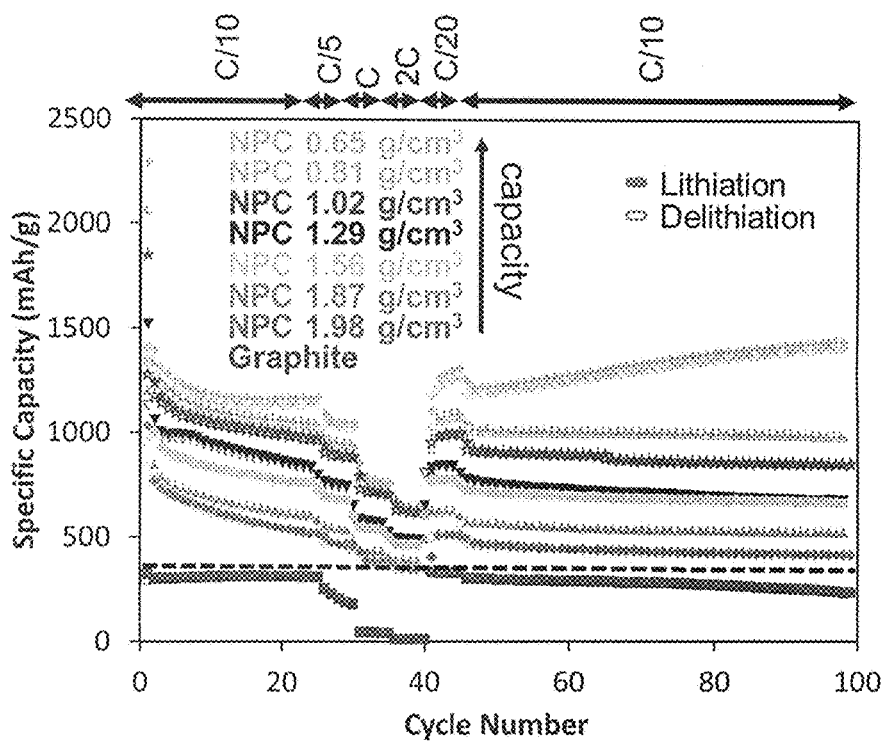
FIG. 7A is a graph of the specific capacity of NPC anodes as a function of the cycle number.
Figure 7B:
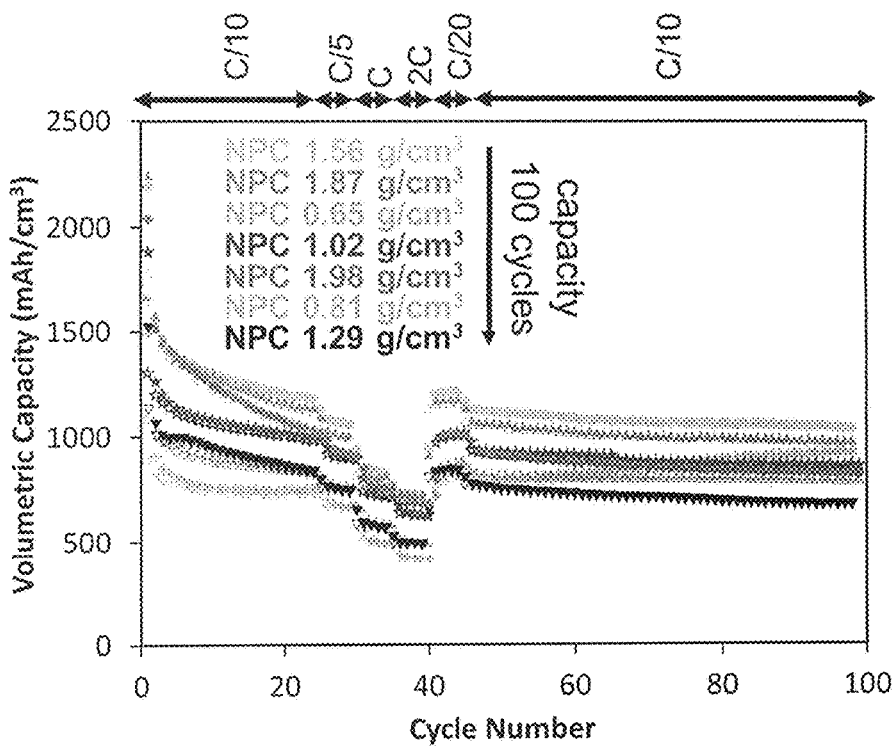
FIG. 7B is a graph of the volumetric capacity of NPC anodes as a function of the cycle number.

The cyclability of the NPC anodes were examined under long-term cycling. FIG. 7A is a graph of the specific capacity of NPC anodes as a function of the cycle number at a rate of C/10 (cell is charged in 10 hours and discharged in 10 hours). To understand rate performance, the rate was decreased and then increased for 5 cycles at C/5, C, 2C, and C/20 before returning to C/10. The 0.65 g/cm$^3$ sample provides the highest specific capacity. In general, NPC exhibits a trend where higher specific capacity is achieved with lower density. This is because there is more space for lithium-storage between the sheets, in pores between stacks of sheets, and at edges and in grain boundaries when the material is less dense. The data shows that NPC can be prepared at several densities with much higher capacity than graphite. As is typical for graphene-like materials, NPC exhibits capacity fade with cycling for the higher density samples. Capacity fade may result from collapse of the sheets to smaller spacing with cycling, from irreversible adsorption of Li ions on some sites, or from impedance associated with SEI formation. The capacity fade can likely be mitigated by protective coatings on the surface of the NPC, such as $Al_2O_3$, $TiO_2$, LiPON, or $Li_xAl_yS$, and denser carbon species or by use of solid electrolytes. See, for example, Y. Cao et al., *ChemElectroChem Comm.* 3, 858 (2016); N. J. Dudney, *J. Power Sources* 89(2), 176 (2000); H.-M. Cheng et al. *J. Phys. Chem. C* 116(14), 7629 (2012); and A. Manthiram et al. *Nat. Rev. Mater.* 2, 16103 (2017). Capacity fade can also be improved by co-deposition of nanoparticles. See, for example, Z. S. Wu et al. *Nano Energy* 1.1, 107 (2012). FIG. 7B is a graph of the volumetric capacity, which is obtained by multiplying the specific capacity by the density. The 1.56 g/cm$^3$ sample provides the highest volumetric capacity. Depending on the application, weight or volume can be the more important parameter.

Figure 8A:
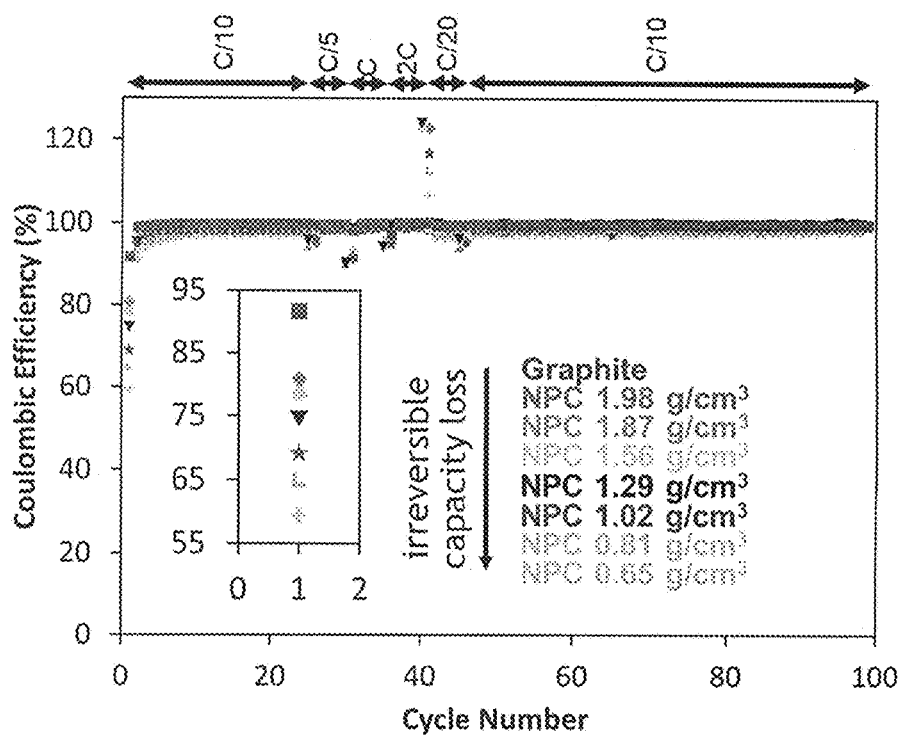
FIG. 8A is a graph of the coulombic efficiency as a function of number of cycles for NPC anodes.
Figure 8B:
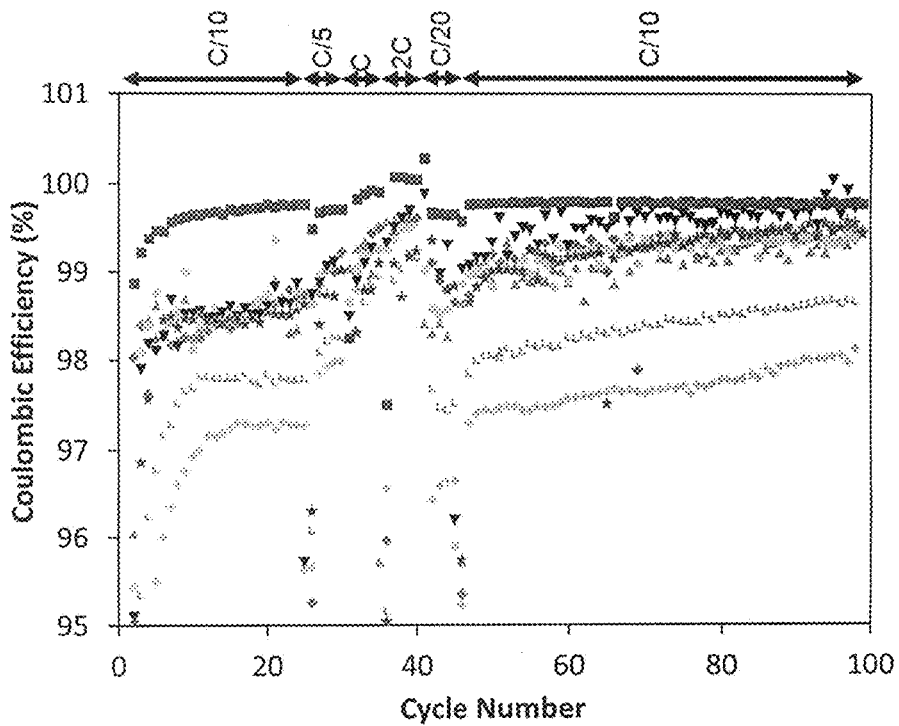
FIG. 8B is a graph of the same data with an expanded ordinate.

FIG. 8A is a graph of the coulombic efficiency (percentage of charge extracted from the battery to the total charge put into the battery over a full cycle) as a function of number of cycles. FIG. 8B shows a more detailed plot where the coulombic efficiency is restricted to 95-101%. The coulombic efficiency is not very dependent on NPC density for densities 21.0 g/cm$^3$. The coulombic efficiency for graphite is very high, reaching over 99.5 percent after only 5 cycles. For the NPC batteries, the coulombic efficiency is lower than graphite, as is typical of graphene materials, though it continues to rise with cycling. The lower coulombic efficiency suggests (1) that more SEI forms with each cycle in NPC than in graphite, or (2) that some portion of Li is trapped in the NPC structure with each cycle and cannot be removed below 3.0 V. The coulombic efficiency drops temporarily immediately after increasing the charge rate from C/10 to C/5 to C to 2C and again when increasing the rate from C/20 to C/10 (black circles), suggesting additional SEI formation or that Li removal is more difficult than insertion at high rates. The latter argument is supported by the increase to higher than 100% coulombic efficiency (orange oval) when decreasing the rate from 2C to C/20. The coulombic efficiency can be improved by protective coatings on the surface of the NPC such as $Al_2O_3$, $TiO_2$, LiPON, $Li_xAl_yS$, and denser carbon species or by use of solid electrolytes. See Y. Cao et al., *ChemElectroChem Comm.* 3, 858 (2016); N. J. Dudney, *J. Power Sources* 89(2), 176 (2000); H.-M. Cheng et al., *J. Phys. Chem. C* 116(14), 7629 (2012); and A. Manthiram et al., *Nat. Rev. Mater.* 2, 16103 (2017). Coulombic efficiency can also be improved by co-deposition of nanoparticles. See Z. S. Wu et al., *Nano Energy* 1.1, 107 (2012).

The present invention has been described as a nanoporous carbon anode material for Li-ion batteries. It will be understood that the above description is merely illustrative of the applications of the principles of the present invention, the scope of which is to be determined by the claims viewed in light of the specification. Other variants and modifications of the invention will be apparent to those of skill in the art.

We claim:

1. An anode for a lithium-ion battery comprising nanoporous carbon, wherein the nanoporous carbon comprises graphene sheets, wherein the average interplanar spacing between the graphene sheets is greater than 4.4 Å.

2. The anode of claim 1, wherein the nanoporous carbon has a density of greater than 0.26 g/cm$^3$ and less than 1.98 g/cm$^3$.

3. The anode of claim 2, wherein the nanoporous carbon has a density of greater than 0.65 g/cm$^3$ and less than 1.56 g/cm$^3$.

4. The anode of claim 1, wherein the nanoporous carbon has a BET surface area of greater than 997 m$^2$/g and less than 1709 m$^2$/g.

5. The anode of claim 1, further comprising a protective coating on a surface of the nanoporous carbon.

6. The anode of claim 5, wherein the protective coating comprises $Al_2O_3$, $TiO_2$, LiPON, or $Li_xAl_yS$.

* * * * *